United States Patent
Yamanaka et al.

(10) Patent No.: US 8,177,005 B2
(45) Date of Patent: May 15, 2012

(54) VEHICLE, DRIVING DEVICE AND CONTROL METHOD THEREOF

(75) Inventors: Akihiro Yamanaka, Okazaki (JP); Kensuke Kamichi, Aichi-ken (JP); Hideaki Goda, Toyota (JP); Masaya Yamamoto, Kasugai (JP); Yoichi Tajima, Anjo (JP); Takeshi Aoki, Nishio (JP); Kazuomi Okasaka, Nagoya (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 261 days.

(21) Appl. No.: 12/224,383

(22) PCT Filed: Mar. 2, 2007

(86) PCT No.: PCT/JP2007/054014
§ 371 (c)(1),
(2), (4) Date: Aug. 26, 2008

(87) PCT Pub. No.: WO2007/102420
PCT Pub. Date: Sep. 13, 2007

(65) Prior Publication Data
US 2009/0008168 A1 Jan. 8, 2009

(30) Foreign Application Priority Data
Mar. 8, 2006 (JP) .................. 2006-063057

(51) Int. Cl.
*B60W 10/06* (2006.01)
*B60W 10/10* (2012.01)

(52) U.S. Cl. ............... 180/65.28; 180/65.275; 180/65.7; 903/930; 903/945

(58) Field of Classification Search ............... 180/65.21, 180/65.265, 65.275, 65.28, 65.285; 903/903, 903/904, 930, 945; 477/109
See application file for complete search history.

(56) References Cited

U.S. PATENT DOCUMENTS
2003/0060328 A1* 3/2003 Beaty ........................... 477/109

FOREIGN PATENT DOCUMENTS

| JP | 2002-130030 A | 5/2002 |
|----|---------------|--------|
| JP | 2002-225578 A | 8/2002 |
| JP | 2004-203219 A | 7/2004 |
| JP | 2004-203220 A | 7/2004 |
| JP | 2004-203368 A | 7/2004 |
| JP | 2004-217096 A | 8/2004 |
| JP | 2004217096 A * | 8/2004 |

(Continued)

*Primary Examiner* — J. Allen Shriver, II
*Assistant Examiner* — Bryan Evans
(74) *Attorney, Agent, or Firm* — Kenyon & Kenyon LLP

(57) ABSTRACT

When a gear of a transmission for transmitting torque of a motor to a drive shaft is shifted while an accelerator is off or an accelerator pedal is slightly stepped on, an upper limit rotation speed is set using a fluctuation rate of a value smaller than a value when the gear is not shifted, a target rotation speed of an engine is set using this upper limit rotation speed, and control is carried out so that an engine is operated at the target rotation speed. By this arrangement, when the accelerator pedal is stepped on and a large torque demand is demanded, rise of the engine rotation speed is restricted, a portion used for raising the rotation speed in power outputted from the engine is made smaller, and a larger power can be outputted to the drive shaft.

9 Claims, 10 Drawing Sheets

FOREIGN PATENT DOCUMENTS

| | | |
|---|---|---|
| JP | 2005-39923 A | 2/2005 |
| JP | 2005-61224 A | 3/2005 |
| JP | 2005-297948 A | 10/2005 |
| JP | 2005-304264 A | 10/2005 |
| JP | 2005-348532 A | 12/2005 |
| JP | 2006-007877 A | 1/2006 |
| JP | 2006-56452 A | 3/2006 |
| JP | 2006-329927 A | 12/2006 |

* cited by examiner

VEHICLE, DRIVING DEVICE AND CONTROL METHOD THEREOF

This is a 371 national phase application of PCT/JP2007/054014 filed 2 Mar. 2007, claiming priority to Japanese Patent Application No. JP 2006-063057 filed 8 Mar. 2006, the contents of which are incorporated herein by reference.

TECHNICAL FIELD

The present invention relates to a vehicle, a driving device and a control method thereof.

BACKGROUND ART

As this type of vehicle, a vehicle has been proposed, comprising an engine, a planetary gear mechanism in which a carrier is connected to a crankshaft of the engine and a ring gear is connected to an axle side, a first motor generator mounted to a sun gear of the planetary gear mechanism, and a second motor generator mounted to the axle side through a transmission (See Patent Document 1, for example). In this vehicle, power from the engine is torque-converted to running power by the planetary gear mechanism, the first motor generator and the second motor generator with gear shifting by the transmission with charge/discharge of a battery.
[Patent Document 1] Japanese Patent Laid-Open No. 2002-225578

DISCLOSURE OF THE INVENTION

In the above vehicle, when a gear of the transmission is shifted while a driving force required for running is small, in order to reduce a torque shock which can be generated at gear shifting, the gear can be shifted by rotation speed synchronization by the second motor generator while the transmission is brought into neutral and the second motor generator is disengaged from the axle side. If a driver steps on an accelerator pedal in the middle of the gear shifting by disengagement of the second motor generator as above, torque cannot be outputted from the second motor generator, and a driving force required by the driver cannot be obtained. In this case, the driving force transmitted to the axle side through a planetary gear mechanism among power outputted by the engine could be increased by driving the first motor generator, but since the driving force originally required for running is small, energy is used to raise the engine rotation speed, and the driving force required by the driver cannot be outputted rapidly.

A vehicle, driving device and control method thereof of the present invention have an object to deal with a rapid change in a driving force required in the middle of gear shifting of a transmission with rapidity. The vehicle, driving device and control method thereof of the present invention have another object to reduce a torque shock which can be generated at gear shifting of the transmission.

In order to satisfy at least part of the above and the other related requirements, the vehicle, driving device and control method thereof of the present invention have the configurations discussed below.

The present invention is directed to a vehicle. The vehicle includes: an internal combustion engine; an electric power-mechanical power input output mechanism connected to a first axle which is either of axles of the vehicle and to an output shaft of the internal combustion engine, and capable of input/output of power from/to the first axle and the output shaft with input/output of electric power and mechanical power; a motor capable of input/output of power; a transmission mechanism connected to the first axle or a second axle which is either of the axles different from the first axle and to a rotating shaft of the motor for transmitting power between the second axle and the rotating shaft with shifting of a plurality of gears; an accumulator unit capable of exchanging electric power with the electric power-mechanical power input output mechanism and the motor; a required driving force setting unit for setting a required driving force required for running; and a control unit for controlling the internal combustion engine, the electric power-mechanical power input output mechanism, and the motor so that running is made by a driving force based on the required driving force set as above with a change within a first change speed of a rotation speed of the internal combustion engine when a gear of the transmission mechanism is not shifted, and for controlling the internal combustion engine, the electric power-mechanical power input output mechanism, the motor, and the transmission mechanism so that the gear of the transmission mechanism is shifted with a change within a second change speed smaller than the first change speed of the rotation speed of the internal combustion engine and running is made by the driving force based on the required driving force set as above when the gear of the transmission mechanism is shifted.

In the vehicle of the present invention, when the gear of the transmission mechanism is not shifted, the internal combustion engine, the electric power-mechanical power input output mechanism and the motor are controlled so that running is made by the driving force based on the required driving force required for running with a change within the first change speed of the rotation speed of the internal combustion engine, and when the gear of the transmission mechanism is shifted, the gear of the transmission mechanism is shifted with a change within the second change speed smaller than the first change speed of the rotation speed of the internal combustion engine, and the internal combustion engine, the electric power-mechanical power input output mechanism, the motor, and the transmission mechanism are controlled so that running is made by the driving force based on the required driving force required for running. That is, while the gear of the transmission mechanism is shifted, the change speed of the rotation speed of the internal combustion engine is made smaller than that when the gear is not changed. By this arrangement, even if the required driving force is rapidly increased in the middle of the gear shifting of the transmission mechanism, energy used for raising the rotation speed of the internal combustion engine can be reduced and power to be outputted to the first axle can be increased, by which a larger driving force can be obtained for running. As a result, the rapid change in the driving force required in the middle of the gear shifting of the transmission mechanism can be coped with quickly. Moreover, the torque shock which can be generated at gear shifting of the transmission mechanism can be reduced. Here, the first change speed and the second change speed may be made the maximum change speed at an increase of the rotation speed of the internal combustion engine.

In one preferable application of the vehicle of the present invention, the control unit is a unit for controlling the transmission mechanism and the motor so that the gear of the transmission mechanism is shifted in a state where a torque from the motor is not outputted to the second axle through the transmission mechanism and for controlling the internal combustion engine and the electric power-mechanical power input output mechanism so that running is made by the driving force outputted based on the required driving force set as above to the first axle through the electric power-mechanical power input output mechanism at gear shifting of the transmission mechanism when the required driving force set as above is in a predetermined low driving force range including a value 0. This arrangement ensures that the torque shock which can be generated at gear shifting of the transmission mechanism can be reduced. In this case, the control unit may be a unit for controlling the transmission mechanism and the motor so that gear shifting of the transmission mechanism is continued as a state where a torque from the motor is not outputted to the second axle through the transmission mechanism and for controlling the internal combustion engine and the electric power-mechanical power input output mechanism so that running is made by the driving force outputted based on the required driving force increased rapidly to the first axle through the electric power-mechanical power input output mechanism when the required driving force set as above is rapidly increased in the middle of gear shifting of the transmission mechanism. Further, the transmission mechanism may be a mechanism for shifting the gear by changing an engagement state of a plurality of clutches and the control unit may be a unit for gear shifting via a state where the motor is disengaged from the second axle side according to the engagement state of the plurality of clutches of the transmission mechanism when the gear of the transmission mechanism is to be shifted.

In another preferable application of the vehicle of the present invention, the electric power-mechanical power input output mechanism is provided with a three shaft-type power input output module connected to three shafts of the first axle, the output shaft of the internal combustion engine, and a rotatable third shaft and for input/output of power from/to the remaining shaft based on power inputted/outputted from/to any two shafts of the three shafts, and a generator capable of input/output of power from/to the third shaft.

The present invention is also directed to a driving device mounted on a vehicle with an internal combustion engine and an accumulator unit capable of being charged/discharged. The driving device includes: an electric power-mechanical power input output mechanism capable of exchange of electric power with the accumulator unit, connected to a first axle which is either of axles of the vehicle and to an output shaft of the internal combustion engine, and capable of input/output of power from/to the first axle and the output shaft with input/output of electric power and mechanical power; a motor capable of exchange of electric power with the accumulator unit and capable of input/output of power; a transmission mechanism connected to the first axle or a second axle which is either of the axles different from the first axle and to a rotating shaft of the motor for transmitting power between the second axle and the rotating shaft with shifting of a plurality of gears; and a control unit for controlling the internal combustion engine as well as the electric power-mechanical power input output mechanism and the motor so that running is made by a driving force based on a required driving force required for running with a change within a first change speed of a rotation speed of the internal combustion engine when a gear of the transmission mechanism is not shifted, and for controlling the internal combustion engine as well as the electric power-mechanical power input output mechanism, the motor, and the transmission mechanism so that the gear of the transmission mechanism is shifted with a change within a second change speed smaller than the first change speed of the rotation speed of the internal combustion engine and running is made by the driving force based on the required driving force when the gear of the transmission mechanism is shifted.

In one preferable embodiment of the driving device of the present invention, when the gear of the transmission mechanism is not shifted, the internal combustion engine as well as the electric power-mechanical power input output mechanism and the motor are controlled so that running is made by the driving force based on the required driving force required for running with a change within the first change speed of the rotation speed of the internal combustion engine, and when the gear of the transmission mechanism is shifted, the gear of the transmission mechanism is shifted with a change within the second change speed smaller than the first change speed of the rotation speed of the internal combustion engine, and the internal combustion engine as well as the electric power-mechanical power input output mechanism, the motor, and the transmission mechanism are controlled so that running is made by the driving force based on the required driving force required for running. That is, while the gear of the transmission mechanism is shifted, the change speed of the rotation speed of the internal combustion engine is made smaller than that when the gear is not changed. By this arrangement, even if the required driving force is rapidly increased in the middle of the gear shifting of the transmission mechanism, energy used for raising the rotation speed of the internal combustion engine can be reduced and power to be outputted to the first axle can be increased, by which a larger driving force can be obtained for running. As a result, the rapid change in the driving force required in the middle of the gear shifting of the transmission mechanism can be coped with quickly. Moreover, the torque shock which can be generated at gear shifting of the transmission mechanism can be reduced.

The present invention is also directed to a control method of a vehicle provided with an internal combustion engine, an electric power-mechanical power input output mechanism connected to a first axle which is either of axles of the vehicle and to an output shaft of the internal combustion engine, and capable of input/output of power from/to the first axle and the output shaft with input/output of electric power and mechanical power, a motor capable of input/output of power, a transmission mechanism connected to the first axle or a second axle which is either of the axles different from the first axle and to a rotating shaft of the motor for transmitting power between the second axle and the rotating shaft with shifting of a plurality of gears, and an accumulator unit capable of exchange of electric power with the electric power-mechanical power input output mechanism and the motor. The control method includes the steps of: controlling the internal combustion engine, the electric power-mechanical power input output mechanism, and the motor so that running is made by a driving force based on a required driving force required for running with a change within a first change speed of a rotation speed of the internal combustion engine when a gear of the transmission mechanism is not shifted, while when the gear of the transmission mechanism is shifted, controlling the internal combustion engine, the electric power-mechanical power input output mechanism, the motor, and the transmission mechanism so that the gear of the transmission mechanism is shifted with a change within a second change speed smaller than the first change speed of the rotation speed of the internal combustion engine and running is made by the driving force based on the required driving force.

In one preferable embodiment of the control method of the vehicle of the present invention, when the gear of the transmission mechanism is not shifted, the internal combustion engine, the electric power-mechanical power input output mechanism and the motor are controlled so that running is made by the driving force based on the required driving force required for running with a change within the first change speed of the rotation speed of the internal combustion engine, and when the gear of the transmission mechanism is shifted, the gear of the transmission mechanism is shifted with a change within the second change speed smaller than the first change speed of the rotation speed of the internal combustion engine, and the internal combustion engine, the electric power-mechanical power input output mechanism, the motor, and the transmission mechanism are controlled so that running is made by the driving force based on the required driving force required for running. That is, while the gear of the transmission mechanism is shifted, the change speed of the rotation speed of the internal combustion engine is made smaller than that when the gear is not changed. By this arrangement, even if the required driving force is rapidly increased in the middle of the gear shifting of the transmission mechanism, energy used for raising the rotation speed of the internal combustion engine can be reduced and power to be outputted to the first axle can be increased, by which a larger driving force can be obtained for running. As a result, the rapid change in the driving force required in the middle of the gear shifting of the transmission mechanism can be coped with quickly. Moreover, the torque shock which can be generated at gear shifting of the transmission mechanism can be reduced.

The present invention is also directed to a control method of a driving device mounted on a vehicle with an internal combustion engine and an accumulator unit capable of being charged/discharged and provided with an electric power-mechanical power input output mechanism capable of exchange of electric power with the accumulator unit, connected to a first axle which is either of axles of the vehicle and to an output shaft of the internal combustion engine, and capable of input/output of power from/to the first axle and the output shaft with input/output of electric power and mechanical power, a motor capable of exchange of electric power with the accumulator unit and capable of input/output of power, and a transmission mechanism connected to the first axle or a second axle which is either of the axles different from the first axle and to a rotating shaft of the motor for transmitting power between the second axle and the rotating shaft with shifting of a plurality of gears. The control method includes the steps of: controlling the internal combustion engine as well as the electric power-mechanical power input output mechanism and the motor so that running is made by a driving force based on a required driving force required for running with a change within a first change speed of a rotation speed of the internal combustion engine when the gear of the transmission mechanism is not shifted, while when the gear of the transmission mechanism is shifted, controlling the internal combustion engine as well as the electric power-mechanical power input output mechanism, the motor, and the transmission mechanism so that the gear of the transmission mechanism is shifted with a change within a second change speed smaller than the first change speed of the rotation speed of the internal combustion engine and running is made by the driving force based on the required driving force.

In one preferable embodiment of the control method of the driving device of the present invention, when the gear of the transmission mechanism is not shifted, the internal combustion engine as well as the electric power-mechanical power input output mechanism and the motor are controlled so that running is made by the driving force based on the required driving force required for running with a change within the first change speed of the rotation speed of the internal combustion engine, and when the gear of the transmission mechanism is shifted, the gear of the transmission mechanism is shifted with a change within the second change speed smaller than the first change speed of the rotation speed of the internal combustion engine, and the internal combustion engine as well as the electric power-mechanical power input output mechanism, the motor, and the transmission mechanism are controlled so that running is made by the driving force based on the required driving force required for running. That is, while the gear of the transmission mechanism is shifted, the change speed of the rotation speed of the internal combustion engine is made smaller than that when the gear is not changed. By this arrangement, even if the required driving force is rapidly increased in the middle of the gear shifting of the transmission mechanism, energy used for raising the rotation speed of the internal combustion engine can be reduced and power to be outputted to the first axle can be increased, by which a larger driving force can be obtained for running. As a result, the rapid change in the driving force required in the middle of the gear shifting of the transmission mechanism can be coped with quickly. Moreover, the torque shock which can be generated at gear shifting of the transmission mechanism can be reduced.

BEST MODE FOR CARRYING OUT THE INVENTION

Figure 1:
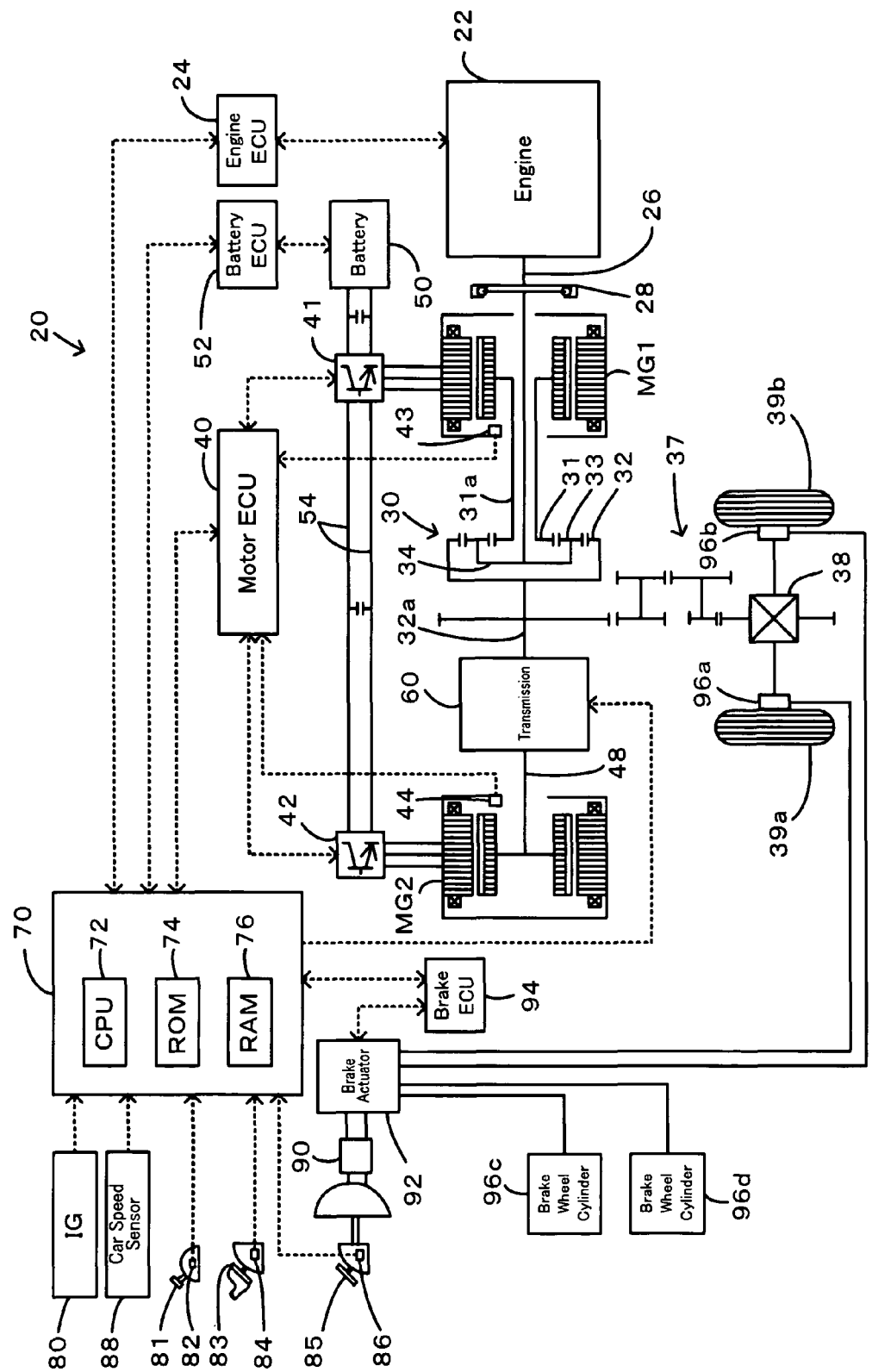
FIG. 1 is a block diagram illustrating an outline of configuration of a hybrid vehicle 20 on which a driving device as an embodiment of the present invention is mounted.

One mode of carrying out the invention is discussed below as a preferred embodiment with reference to the accompanied drawings. FIG. 1 schematically illustrates the configuration of a hybrid vehicle 20 in one embodiment of the invention. As illustrated, the hybrid vehicle 20 of the embodiment includes an engine 22, a three shaft-type power distribution and integration mechanism 30 that is linked to a crankshaft 26 or an output shaft of the engine 22 via a damper 28, a motor MG1 that is connected to the power distribution and integration mechanism 30 and has power generation capability, a motor MG2 that is linked to the power distribution and integration mechanism 30 via a transmission 60, a brake actuator 92 for controlling brakes in drive wheels 39a, 39b and driven wheels (not shown), and a hybrid electronic control unit 70 that controls the whole driving system of the hybrid vehicle 20.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 includes a sun gear 31 as an external gear, a ring gear 32 as an internal gear arranged concentrically with the sun gear 31, multiple pinion gears 33 engaging with the sun gear 31 and with the ring gear 32, and a carrier 34 holding the multiple pinion gears 33 to allow both their revolutions and their rotations on their axes. The power distribution and integration mechanism 30 is thus constructed as a planetary gear mechanism including the sun gear 31, the ring gear 32, and the carrier 34 as rotational elements of differential motions. The carrier 34, the sun gear 31, and the ring gear 32 of the power distribution and integration mechanism 30 are respectively linked to the crankshaft 26 of the engine 22, to the motor MG1, and to the motor MG2 via the transmission 60. When the motor MG1 functions as a generator, the power of the engine 22 input via the carrier 34 is distributed into the sun gear 31 and the ring gear 32 corresponding to their gear ratio. When the motor MG1 functions as a motor, on the other hand, the power of the engine 22 input via the carrier 34 is integrated with the power of the motor MG1 input via the sun gear 31 and is output to the ring gear 32. The ring gear 32 is mechanically connected to the front drive wheels 39a and 39b of the hybrid vehicle 20 via a gear mechanism 37 and a differential gear 38. The power output to the ring gear 32 is thus transmitted to the drive wheels 39a and 39b via the gear mechanism 37 and the differential gear 38. In the driving system of the hybrid vehicle 20, the power distribution and integration mechanism 30 is linked to three shafts, that is, the crankshaft 26 or the output shaft of the engine 22 connected with the carrier 34, a sun gear shaft 31a or a rotating shaft of the motor MG1 connected with the sun gear 31, and a ring gear shaft 32a or a drive shaft connected with the ring gear 32 and mechanically linked to the drive wheels 39a and 39b.

The motors MG1 and MG2 are constructed as known synchronous motor generators that may be actuated both as a generator and as a motor. The motors MG1 and MG2 transmit electric powers to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. Both the motors MG1 and MG2 are driven and controlled by a motor electronic control unit 40 (hereafter referred to as motor ECU 40). The motor ECU 40 inputs signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 executes a rotation speed computation routine (not shown) to calculate rotation speeds Nm1 and Nm2 of the rotors in the motors MG1 and MG2 from the input signals from the rotational position detection sensors 43 and 44. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements.

Figure 2:
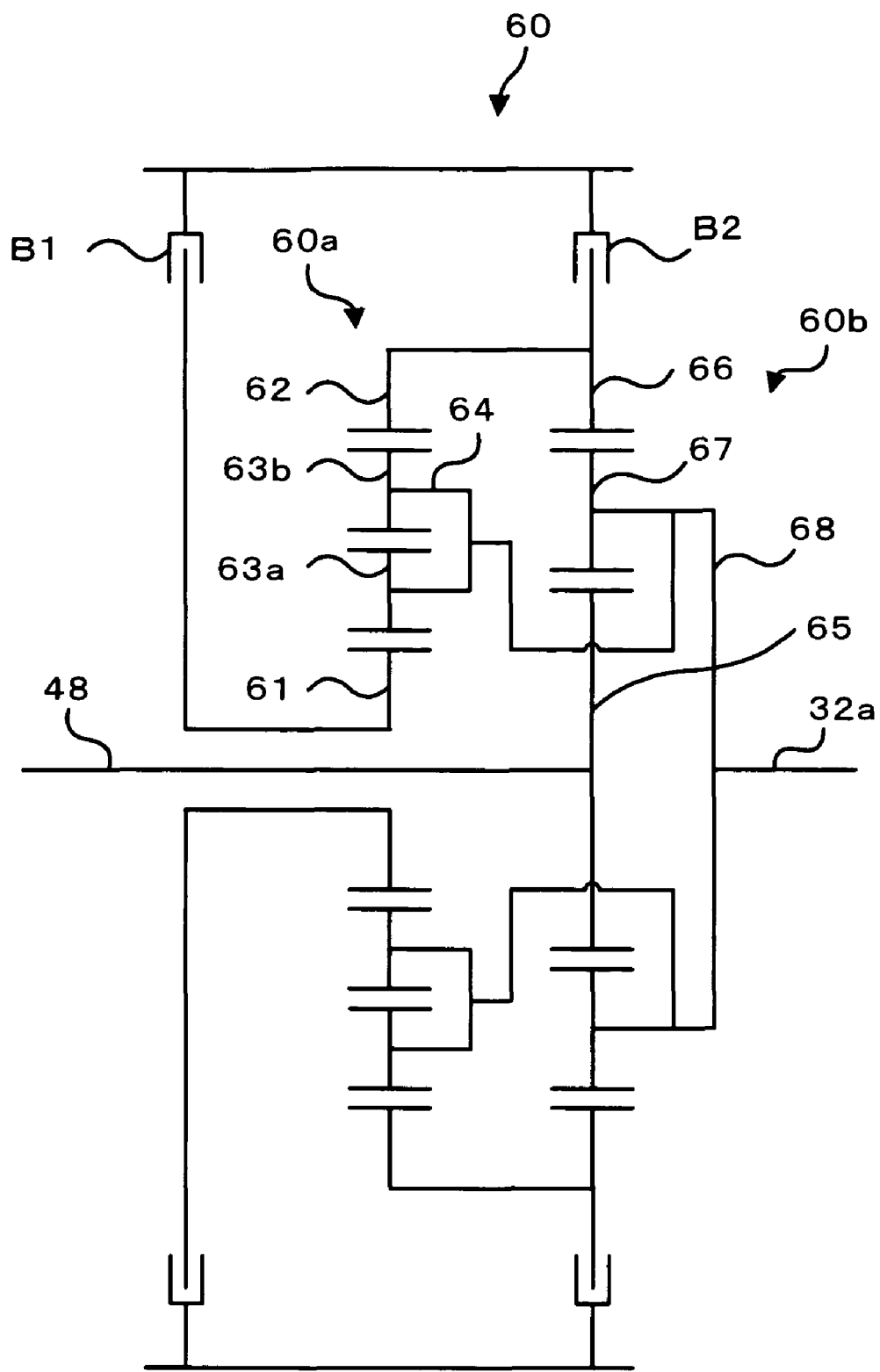
FIG. 2 is an explanatory diagram illustrating an example of configuration of a transmission 60.

The transmission 60 functions to connect and disconnect a rotating shaft 48 of the motor MG2 with and from the ring gear shaft 32a. In the connection state, the transmission 60 reduces the rotation speed of the rotating shaft 48 of the motor MG2 at two different reduction gear ratios and transmits the reduced rotation speed to the ring gear shaft 32a. One typical structure of the transmission 60 is shown in FIG. 2. The transmission 60 shown in FIG. 2 has a double-pinion planetary gear mechanism 60a, a single-pinion planetary gear mechanism 60b, and two brakes B1 and B2. The double-pinion planetary gear mechanism 60a includes a sun gear 61 as an external gear, a ring gear 62 as an internal gear arranged concentrically with the sun gear 61, multiple first pinion gears 63a engaging with the sun gear 61, multiple second pinion gears 63b engaging with the multiple first pinion gears 63a and with the ring gear 62, and a carrier 64 coupling the multiple first pinion gears 63a with the multiple second pinion gears 63b to allow both their revolutions and their rotations on their axes. The engagement and the release of the brake B1 stop and allow the rotation of the sun gear 61. The single-pinion planetary gear mechanism 60b includes a sun gear 65 as an external gear, a ring gear 66 as an internal gear arranged concentrically with the sun gear 65, multiple pinion gears 67 engaging with the sun gear 65 and with the ring gear 66, and a carrier 68 holding the multiple pinion gears 67 to allow both their revolutions and their rotations on their axes. The sun gear 65 and the carrier 68 of the single-pinion planetary gear mechanism 60b are respectively connected to the rotating shaft 48 of the motor MG2 and to the ring gear shaft 32a. The engagement and the release of the brake B2 stop and allow the rotation of the ring gear 66. The double-pinion planetary gear mechanism 60a and the single-pinion planetary gear mechanism 60b are coupled with each other via linkage of the respective ring gears 62 and 66 and linkage of the respective carriers 64 and 68. In the transmission 60, the combination of the released brakes B1 and B2 disconnects the rotating shaft 48 of the motor MG2 from the ring gear shaft 32a. The combination of the released brake B1 and the engaged brake B2 reduces the rotation of the rotating shaft 48 of the motor MG2 at a relatively large reduction gear ratio and transmits the largely reduced rotation to the ring gear shaft 32a. This state is hereafter expressed as Lo-gear state, and the reduction gear ratio in this state is represented by Glo. The combination of the engaged brake B1 and the released brake B2 reduces the rotation of the rotating shaft 48 of the motor MG2 at a relatively small reduction gear ratio and transmits the slightly reduced rotation to the ring gear shaft 32a. This state is hereafter expressed as Hi-gear state, and the reduction gear ratio in this state is represented by Ghi. The combination of the engaged brakes B1 and B2 prohibits the rotations of the rotating shaft 48 and the ring gear shaft 32a.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

A brake actuator 92 is configured so as to adjust a hydraulic pressure of brake wheel cylinders 96a to 96d so that a braking torque according to a pressure (brake pressure) of a brake master cylinder 90 generated in accordance with a stepped-on amount of a brake pedal 85 and a car speed V and a portion borne by the brake in a braking force acting on the vehicle works on drive wheels 39a, 39b and driven wheels, not shown, and so as to adjust the hydraulic pressure of the brake wheel cylinders 96a to 96d so that the braking torque acts on the drive wheels 39a, 39b and the driven wheels, regardless of the stepped-on amount of the brake pedal 85. The brake actuator 92 is controlled by a brake electronic control unit (hereinafter referred to as brake ECU) 94. The brake ECU 94 receives, via a signal line, not shown, inputs of signals of a wheel speed from a wheel speed sensor, not shown, mounted to the drive wheels 39a, 39b and the driven wheels and a steering angle from a steering angle sensor, not shown, so as to carry out anti-lock brake system function (ABS) for preventing slip caused by lock of any of the drive wheels 39a, 39b or the driven wheels when a driver steps on the brake pedal 85, traction control (TRC) for preventing slip caused by spin-out of either of the drive wheels 39a, 39b when the driver steps on the accelerator pedal 83, and attitude maintaining control (VSC) for maintaining an attitude of the vehicle while turning. The brake ECU 94 communicates with the hybrid electronic control unit 70 so as to drive and control the brake actuator 92 by a control signal from the hybrid electronic control unit 70 and outputs data relating to a state of the brake actuator 92 when necessary to the hybrid electronic control unit 70.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc from an accelerator pedal position sensor 84 that measures a step-on amount of an accelerator pedal 83, a brake pedal position BP or the driver's depression amount of the brake pedal 85 from a brake pedal position sensor 86, and the car speed V from a car speed sensor 88. The hybrid electronic control unit 70 outputs, via its output port, driving signals to actuators (not shown) to regulate the brakes B1 and B2 in the transmission 60. The hybrid electronic control unit 70 establishes communication with the engine ECU 24, the motor ECU 40, the battery ECU 52, and the brake ECU 94 via its communication port to receive and send the diversity of control signals and data from and to the engine ECU 24, the motor ECU 40, the battery ECU 52, and the brake ECU 94, as mentioned above.

The hybrid vehicle 20 of the embodiment thus constructed calculates a torque demand to be output to the ring gear shaft 32a functioning as the drive shaft, based on observed values of the car speed V and the accelerator opening Acc, which corresponds to a driver's step-on amount of the accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution and integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution and integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
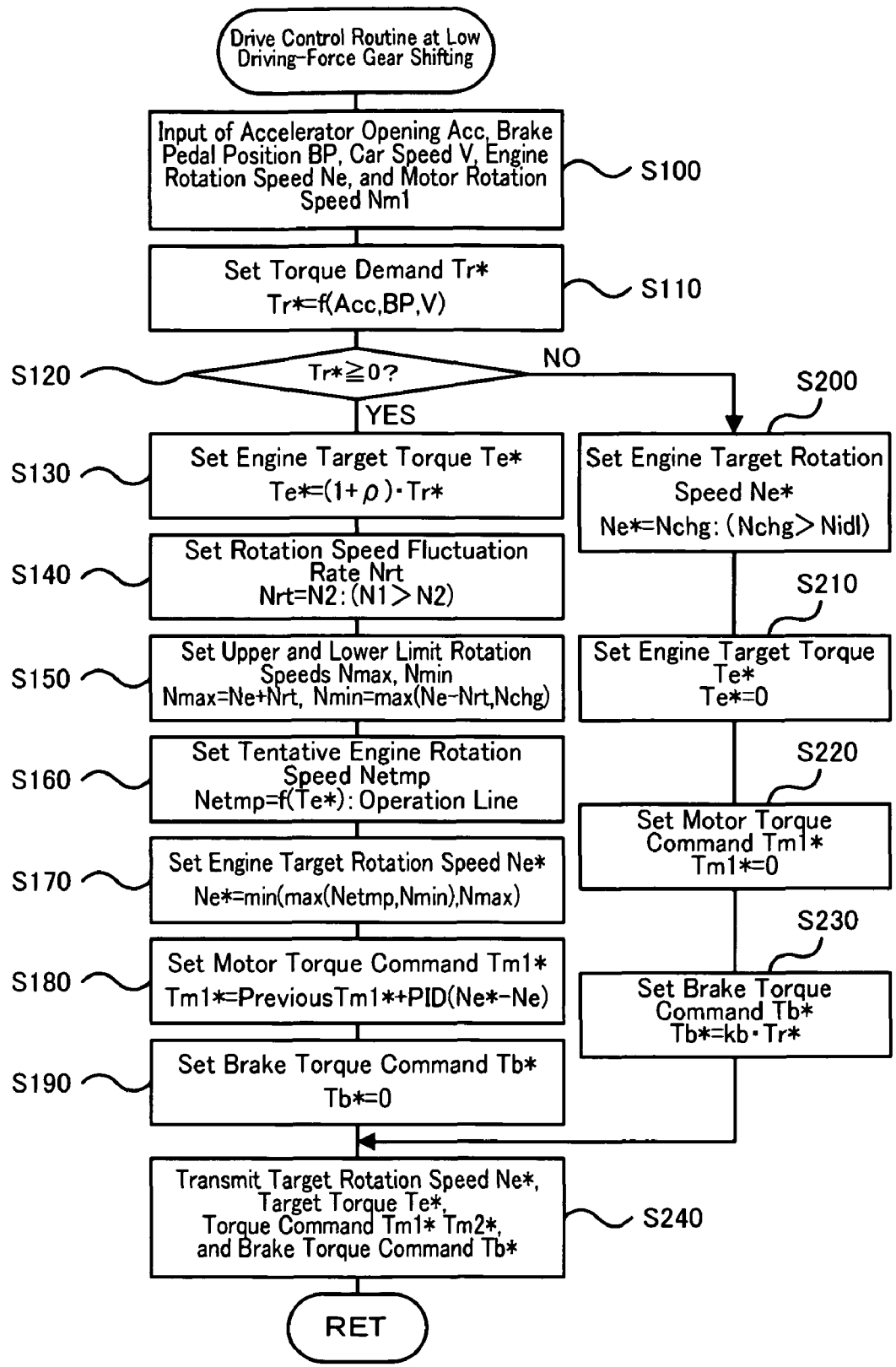
FIG. 3 is a flowchart illustrating an example of a driving control routine at low driving-force gear shifting executed by a hybrid electronic control unit 70 according to the embodiment.
Figure 4:
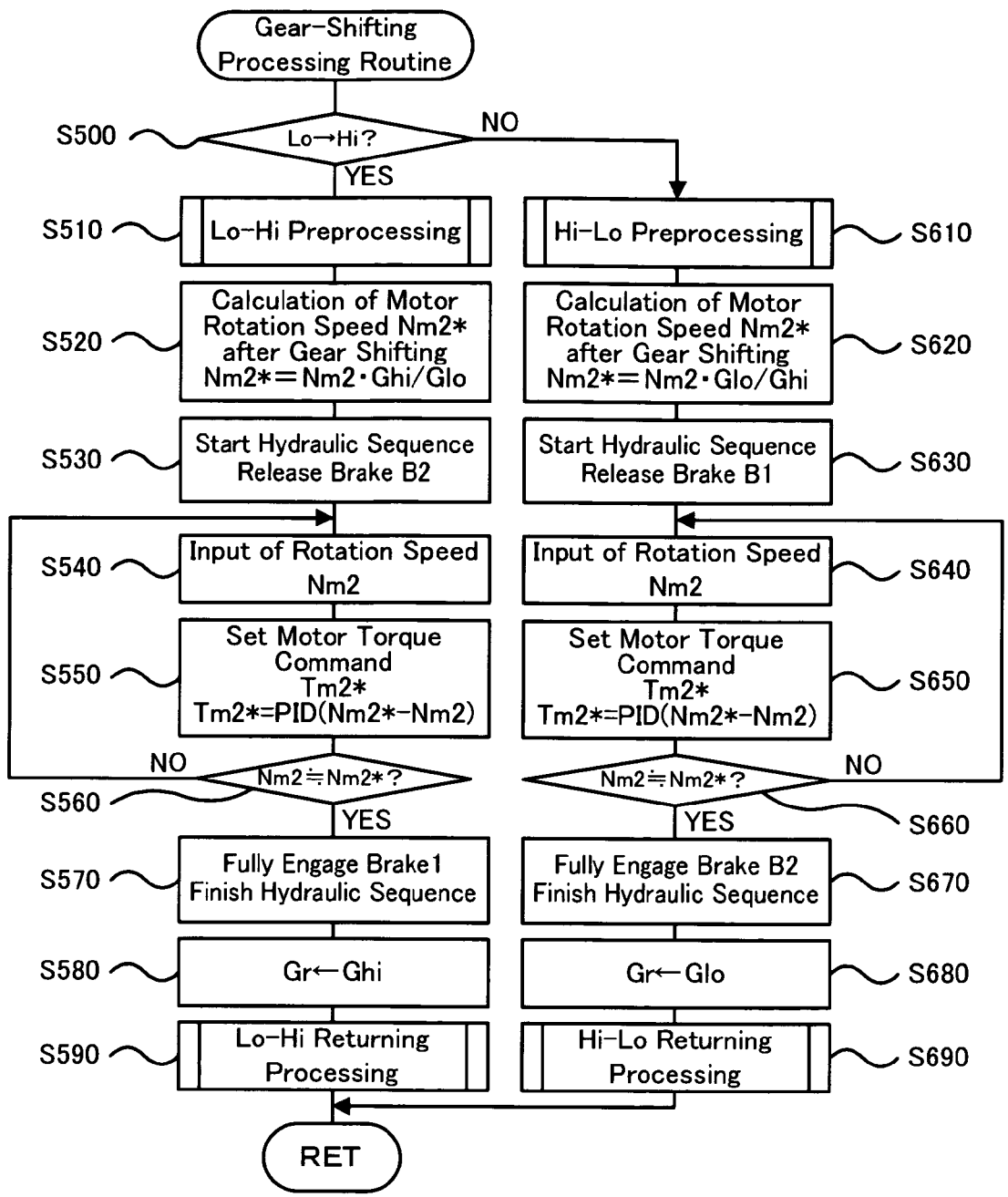
FIG. 4 is a flowchart illustrating an example of a gear shifting processing routine.

Next, an operation of the hybrid vehicle 20 in the embodiment, particularly an operation at gear shifting of the transmission 60 when the accelerator is off or while running by a low driving force with the accelerator pedal 83 slightly stepped on will be described. FIG. 3 is a flowchart illustrating an example of a driving control routine at low driving-force gear shifting at the gear shifting of the transmission 60 executed by the hybrid electronic control unit 70 in the embodiment when the accelerator pedal 83 is not stepped on by the driver or even if the accelerator pedal 83 is stepped on, when the stepped-on amount is small. FIG. 4 is a flowchart illustrating an example of a gear-shifting processing routine executed by the hybrid electronic control unit 70 at gear shifting of the transmission 60. First, for convenience of the explanation, the gear shifting of the transmission 60 will be described.

Figure 5:
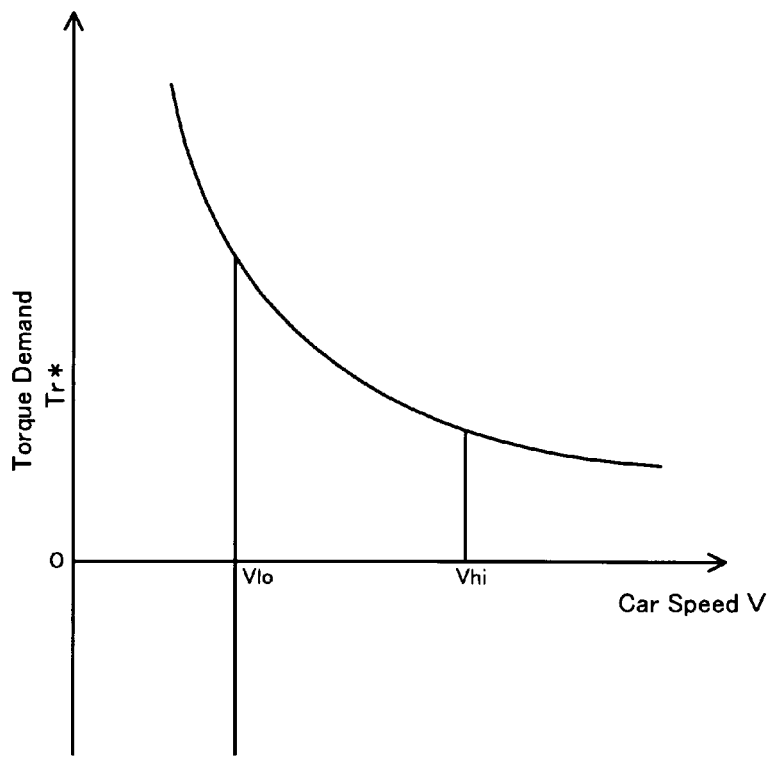
FIG. 5 is an explanatory diagram illustrating an example of a gear shifting map.

The gear of the transmission 60 is shifted when it is determined by gear-shifting request execution processing, not shown, that either of gear shifting will be executed based on determination on whether Lo-Hi gear shifting for changing the transmission 60 from a Lo-gear state to a Hi-gear state is to be made based on a car speed V and a torque demand Tr* required for the vehicle or the determination on whether Hi-Lo gear shifting for changing the transmission 60 from the Hi-gear state to the Lo-gear state is to be made based on the car speed V and the torque demand Tr*. An example of a gear shifting map for gear shifting of the transmission 60 is shown in FIG. 5. In the example shown in FIG. 5, when the car speed V becomes larger, exceeding a Lo-Hi gear-shifting line Vhi in the Lo-gear state of the transmission 60, the transmission 60 is shifted from the Lo-gear state to the Hi-gear state, while when the car speed V becomes smaller, exceeding a Hi-Lo gear-shifting line Vlo in the Hi-gear state of the transmission 60, the transmission 60 is shifted from the Hi-gear state to the Lo-gear state.

When the gear-shifting processing routine in FIG. 4 is executed, the CPU 72 in the hybrid electronic control unit 70 first determines if the gear shifting of the transmission 60 is either of the Lo-Hi gear shifting in which the Lo-gear state is shifted to the Hi-gear state or the Hi-Lo gear shifting in which the Hi-gear state is shifted to the Lo-gear state (Step S500). This determination can be made by determining in a gear shifting map in FIG. 5 if the car speed V has become larger, exceeding the Lo-Hi gear-shifting line Vhi or the car speed V has become smaller, exceeding the Hi-Lo gear-shifting line Vlo.

At the Lo-Hi gear shifting, a Lo-Hi preprocessing is executed (Step S510). Here, as the Lo-Hi preprocessing, a processing to set a value 0 to a torque from the motor MG2 from the need to prevent a torque shock at gear shifting is executed. For example, a processing to replace a driving torque outputted from the motor MG2 by a driving torque from the engine 22 or the motor MG1 when the driving torque is outputted from the motor MG2, and a processing to replace a braking torque from the motor MG2 by a brake torque acting on the drive wheels 39a, 39b and the driven wheels by the brake wheel cylinders 96a to 96d when the braking torque is outputted from the motor MG2 are executed. When the Lo-Hi preprocessing is executed, a rotation speed Nm2* of the motor MG2 after gear shifting is calculated using the following equation (1) by the current rotation speed Nm2 of the motor MG2 and gear ratios Glo, Ghi of the transmission 60 (Step S520). And a hydraulic sequence for the hydraulically driven actuator, not shown, of the transmission 60, for releasing the brake B2 of the transmission 60 and engaging the brake B1 is started (Step S530), and a processing to set a torque command Tm2* of the motor MG2 by an equation (2) so that the motor MG2 is rotated at the rotation speed Nm2* after gear shifting till the rotation speed Nm2 of the motor MG2 reaches the vicinity of the rotation speed Nm2* after gear shifting and to transmit the command to the motor ECU 40 is repeated (Steps S540 to 560). Here, the rotation speed Nm2 of the motor MG2 is calculated based on a rotational position of a rotor of the motor MG2 detected by the rotational position detection sensor 44 and inputted from the motor ECU 40 via communication. Also, the equation (2) is a relational expression in feedback control with the rotation speed of the motor MG2 as the rotation speed Nm2* after gear shifting, in which k1 in the first term on the right-hand side is a gain of a proportional term, and k2 in the second term on the right-hand side is a gain of an integral term. The set torque command Tm2* of the motor MG2 is transmitted to the motor ECU 40, and a switching element of the inverter 42 is switching-controlled so that a torque corresponding to the torque command Tm2* is outputted by the motor ECU 40 from the motor MG2:

$$Nm2^* = Nm2 \cdot Ghi/Glo \qquad (1)$$

$$Tm2^* = k1(Nm2^* - Nm2) + k2\int(Nm2^* - Nm2)dt \qquad (2)$$

Figure 6:
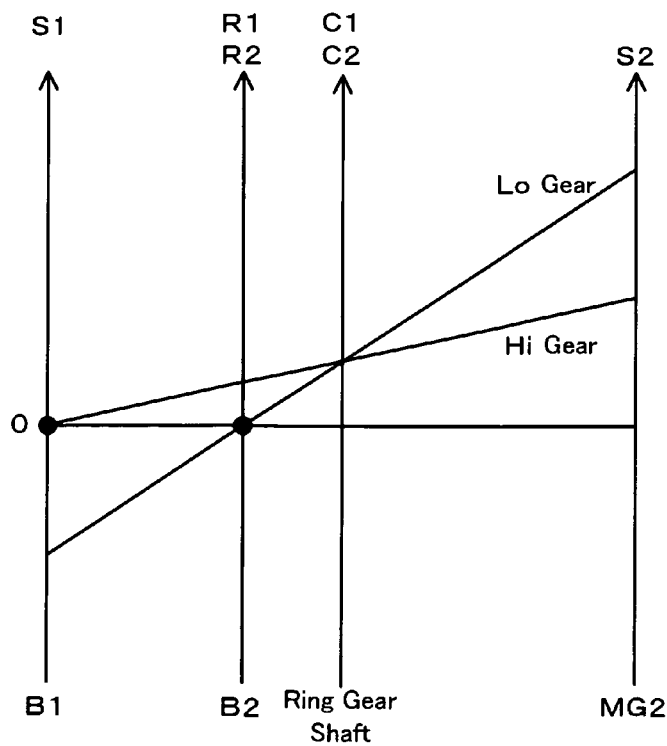
FIG. 6 is an explanatory diagram illustrating an example of an alignment chart of the transmission 60 at Lo-Hi gear shift and Hi-Lo gear shift.
Figure 7:
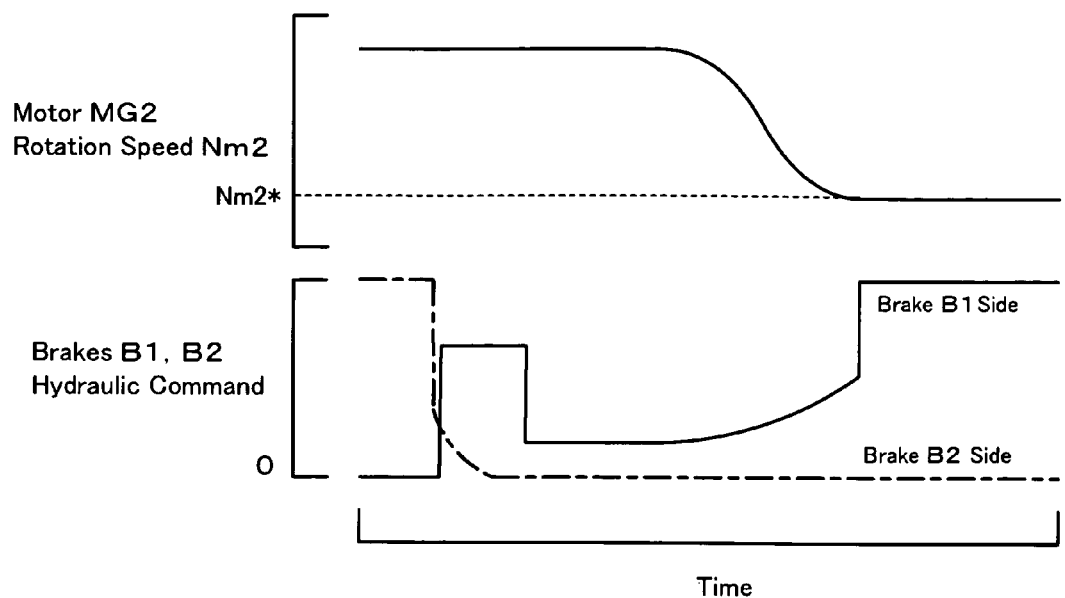
FIG. 7 is an explanatory diagram illustrating an example of a hydraulic sequence in a hydraulic circuit for driving/control of brakes B1, B2 of the transmission 60 at the Lo-Hi gear shift.

When the rotation speed Nm2 of the motor MG2 reaches the vicinity of the rotation speed Nm2* after gear shifting, the hydraulic sequence is finished with the brake B1 fully engaged (Step S570), a gear ratio Ghi of the Hi gear is set for a gear ratio Gr of the transmission 60 used for drive and control (Step S580), a Lo-Hi returning processing as a returning processing contrary to the Lo-Hi preprocessing is carried out (Step S590), and the gear shift processing is finished. An example of an alignment chart of the transmission 60 at the Lo-Hi gear shifting and the Hi-Lo gear shifting is shown in FIG. 6, and an example of the hydraulic sequence of the Lo-Hi gear shifting is shown in FIG. 7. In FIG. 6, an S1 axis shows a rotation speed of the sun gear 61 of the double-pinion planetary gear mechanism 60a, R1, R2 axes show rotation speeds of the ring gears 62, 66 of the double-pinion planetary gear mechanism 60a and the single-pinion planetary gear mechanism 60b, C1, C2 axes show rotation speeds of the carriers 64, 68 of the double-pinion planetary gear mechanism 60a and the single-pinion planetary gear mechanism 60b, which is the rotation speed of the ring gear shaft 32a, and an S2 axis shows the rotation speed of the sun gear 65 of the single-pinion planetary gear mechanism 60b, which is the rotation speed of the motor MG2. In the Lo-gear state, the brake B2 is engaged and the brake B1 is released as shown in the figure. If the brake B2 is released from this state, the motor MG2 is disengaged from the ring gear shaft 32a. In this state, by controlling so that the motor MG2 is rotated at the rotation speed Nm2* after gear shifting and by engaging the brake B1 when the motor MG2 reaches to be rotated at the rotation speed Nm2* after gear shifting, the Lo-Hi gear shifting is accomplished without outputting a torque from the transmission 60 to the ring gear shaft 32a as a drive shaft. As above, since the transmission 60 is shifted Lo-Hi with rotation speed synchronization of the motor MG2, occurrence of a torque shock at gear shifting can be prevented. In FIG. 7, the hydraulic command of the brake B1 is large immediately after start of the sequence because of fast fill in order to fill oil in a cylinder by the time when an engaging force acts on the brake B1.

At Step S500, if it is determined as the Hi-Lo gear shifting, Hi-Lo preprocessing is executed (Step S610). Here, as the Hi-Lo preprocessing, a processing to set the value 0 to torque from the motor MG2 from the need to prevent the torque shock at gear shifting. For example, a processing to replace the driving torque outputted from the motor MG2 by the driving torque from the engine 22 or the motor MG1 when the driving torque is outputted from the motor MG2 is executed, and when the braking torque is outputted from the motor MG2, a processing to replace the braking torque outputted from the motor MG2 by the brake torque acting on the drive wheels 39a, 39b and the driven wheels by the brake wheel cylinders 96a to 96d is carried out. When the Hi-Lo preprocessing is executed, the rotation speed Nm2* as the rotation speed of the motor MG2 is calculated by the following equation (3) (Step S620) when gear is shifted using the current rotation speed Nm2 of the motor MG2, the gear ratio Glo in the Lo-gear state and the gear ratio Ghi in the Hi-gear state of the transmission 60 to change the transmission 60 from the Hi-gear state to the Lo-gear state. The hydraulic sequence for the hydraulically driven actuator of the transmission 60 is started to release the brake B1 and to engage the brake B2 of the transmission 60 (Step S630), the processing to set the torque command Tm2* of the motor MG2 by the above equation (2) so that the motor MG2 is rotated at the rotation speed Nm2* after gear shifting till the rotation speed Nm2 of the motor MG2 reaches the vicinity of the rotation speed Nm2* after gear shifting and to transmit to the motor ECU 40 is repeated (Steps S640 to 660).

$$Nm2^* = Nm2 \cdot Glo/Ghi \qquad (3)$$

Figure 8:
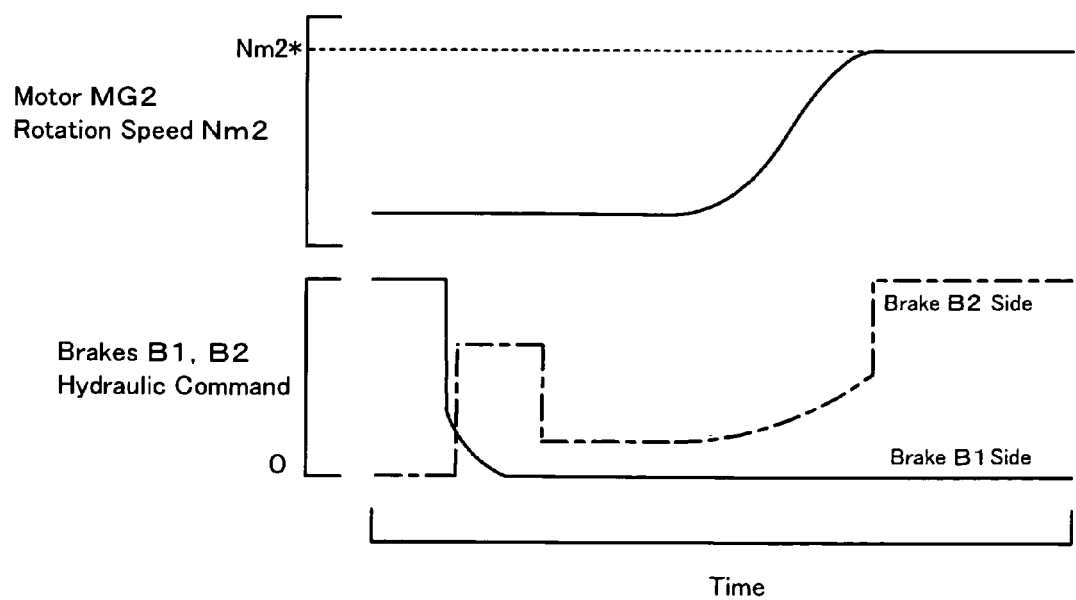
FIG. 8 is an explanatory diagram illustrating an example of a hydraulic sequence in a hydraulic circuit for driving/control of brakes B1, b2 of the transmission 60 at the Hi-Lo gear shift.

When the rotation speed Nm2 of the motor MG2 reaches the vicinity of the rotation speed Nm2* after gear shifting, the hydraulic sequence is finished with the brake B2 fully engaged (Step S670), the gear ratio Glo of the Lo gear is set for the gear ratio Gr of the transmission 60 used for drive and control (Step S680), and a Hi-Lo returning processing as a returning processing contrary to the Hi-Lo preprocessing is carried out (Step S690), and the gear-shifting processing is finished. An example of the hydraulic sequence when the transmission 60 is shifted from the Hi-gear state to the Lo-gear state is shown in FIG. 8. In this figure, the hydraulic command of the brake B2 is large immediately after start of the sequence because of the fast fill to fill oil in the cylinder by the time when an engaging force acts on the brake B2.

Next, drive and control at gear shifting at this type of low driving force will be described. When the drive and control routine at low driving-force gear shifting in FIG. 3 is executed, the CPU 72 in the hybrid electronic control unit 70 first executes a processing to input data required for control such as the accelerator opening Acc from the accelerator pedal position sensor 84, the brake pedal position BP from the brake pedal position sensor 86, the car speed V from the car speed sensor 88, a rotation speed Ne of the engine 22, the rotation speed Nm1 of the motor MG1 and the like (Step S100). Here, the rotation speed Ne of the engine 22 is calculated based on a signal from a crank position sensor, not shown, mounted to the crankshaft 26 and inputted from the engine ECU 24 via communication. Also, the rotation speeds Nm1, Nm2 of the motors MG1, MG2 are calculated based on rotational positions of the rotors of the motors MG1, MG2 detected by the rotational position detection sensors 43, 44 and inputted from the motor ECU 40 via communication.

Figure 9:
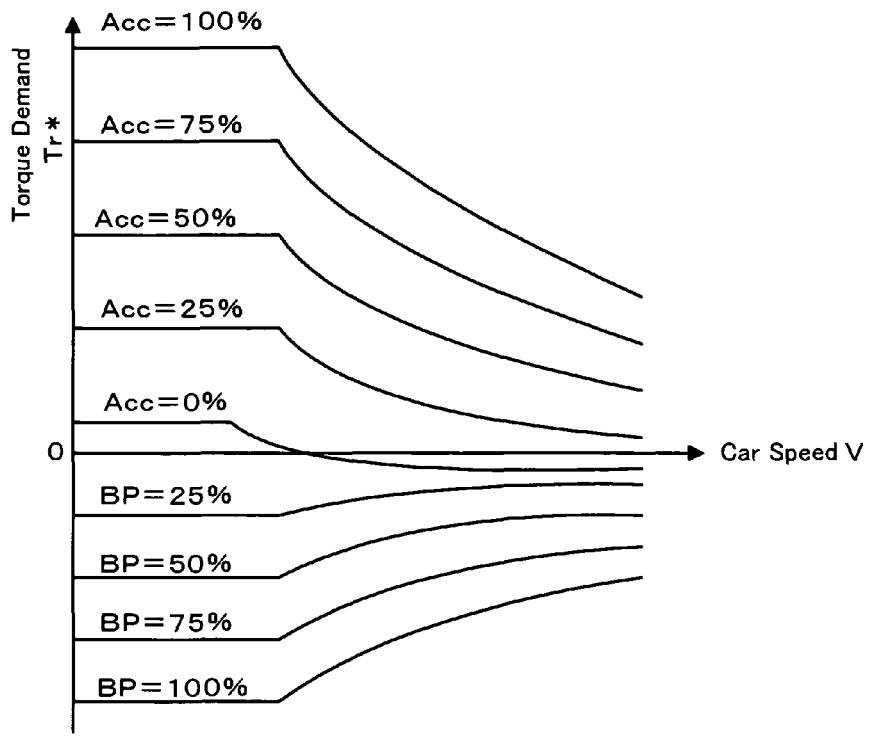
FIG. 9 is an explanatory diagram illustrating an example of a map for setting torque demand.

When data is inputted as above, the torque demand Tr* to be outputted to the ring gear shaft 32a as the drive shaft connected to the drive wheels 39a, 39b is set as a torque required for the vehicle based on the inputted accelerator opening Acc, the brake pedal position BP and the car speed V (Step S110), and it is determined if the set torque demand Tr* is or more than a value 0, that is, whether it is a driving torque for acceleration or a braking torque for deceleration (Step S120). Here, the torque demand Tr* is stored in the ROM 74 as a map for setting torque demand by determining a relation among the accelerator opening Acc, the brake pedal position BP, the car speed V and the torque demand Tr* in advance in this embodiment, and when the accelerator opening Acc, the brake pedal position BP and the car speed v are given, the corresponding torque demand Tr* is derived and set from the stored map. An example of the map for setting torque demand is shown in FIG. 9. The determination is made on whether the torque demand Tr* is a driving torque for acceleration or a braking torque for deceleration because power from the engine 22 is not necessary basically when the braking torque for deceleration is outputted.

Figure 10:
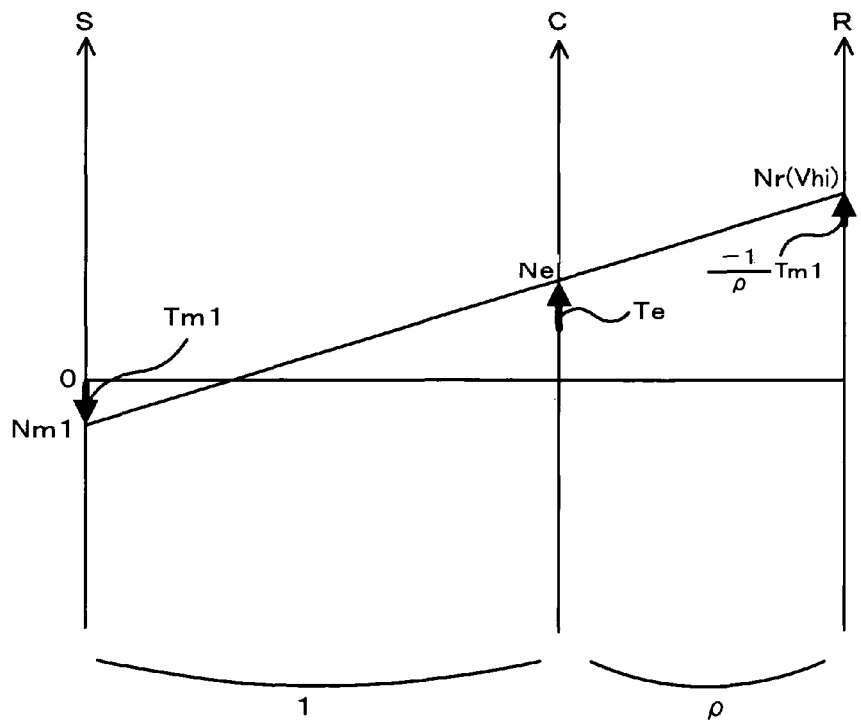
FIG. 10 is an explanatory diagram illustrating an example of an alignment chart showing a dynamic relation between a rotation speed and a torque in a rotating element of a power distribution and integration mechanism 30 when a torque demand Tr* is a driving torque for acceleration.

When the torque demand Tr* is the driving torque for acceleration, a target torque Te* of the engine 22 is set by the following equation (4) using a gear ratio ρ of the power distribution and integration mechanism 30 so that the torque outputted from the engine 22 works as the torque demand Tr* on the ring gear shaft 32a through the power distribution and integration mechanism 30 (Step S130). An alignment chart illustrating a dynamic relation between the rotation speed in the rotating element of the power distribution and integration mechanism 30 and the torque when the torque demand Tr* is the driving torque for acceleration is shown in FIG. 10. In this figure, an S axis in the left indicates the rotation speed of the sun gear 31, which is the rotation speed Nm1 of the motor MG1, a C axis indicates the rotation speed of the carrier 34, which is the rotation speed Ne of the engine 22, and an R axis indicates the rotation speed Nr of the ring gear 32 obtained by multiplying the rotation speed Nm2 of the motor MG 2 by the gear ratio Gr of the transmission 60. A bold arrow on the R axis indicates a torque acting on the ring gear shaft 32a through the power distribution and integration mechanism 30 by torque output from the motor MG1 or a torque acting on the ring gear shaft 32a through the power distribution and integration mechanism 30 by torque output from the engine 22. The equation (4) can be easily derived from such an alignment chart in FIG. 10.

$$Te^* = (1+\rho) \cdot Tr^* \quad (4)$$

Then, a rate value N2 smaller than a rate value N1 at a normal time when gear shifting of the transmission 60 is not carried out is set as a fluctuation rate Nrt of the rotation speed of the engine 22 (Step S140), the set fluctuation rate Nrt is added to the rotation speed Ne of the engine 22 so as to set an upper limit rotation speed Nmax, and the larger of a value obtained by subtracting the fluctuation rate Nrt from the rotation speed Ne of the engine 22 and a minimum rotation speed Nchg at gear shifting set as a rotation speed higher than an idling rotation speed Nidl is set as a lower limit rotation speed Nmin (Step S150). The upper limit rotation speed Nmax is set as above using the rate value N2 smaller than the rate value N1 at the normal time when the gear of the transmission 60 is not shifted in order to increase the power to be outputted to the ring gear shaft 32a from power outputted from the engine 22 by restricting rise of the rotation speed of the engine 22 when a large torque demand Tr* or power is demanded by stepping-on on the accelerator pedal 83 by the driver. Also, the lower limit rotation speed Nmin is set at or more than the minimum rotation speed at gear shifting Nchg larger than the idling rotation speed Ndil in order to output a large power more rapidly from the engine 22 when the large torque demand Tr* or power is demanded by stepping-on on the accelerator pedal 83 by the driver.

Figure 11:
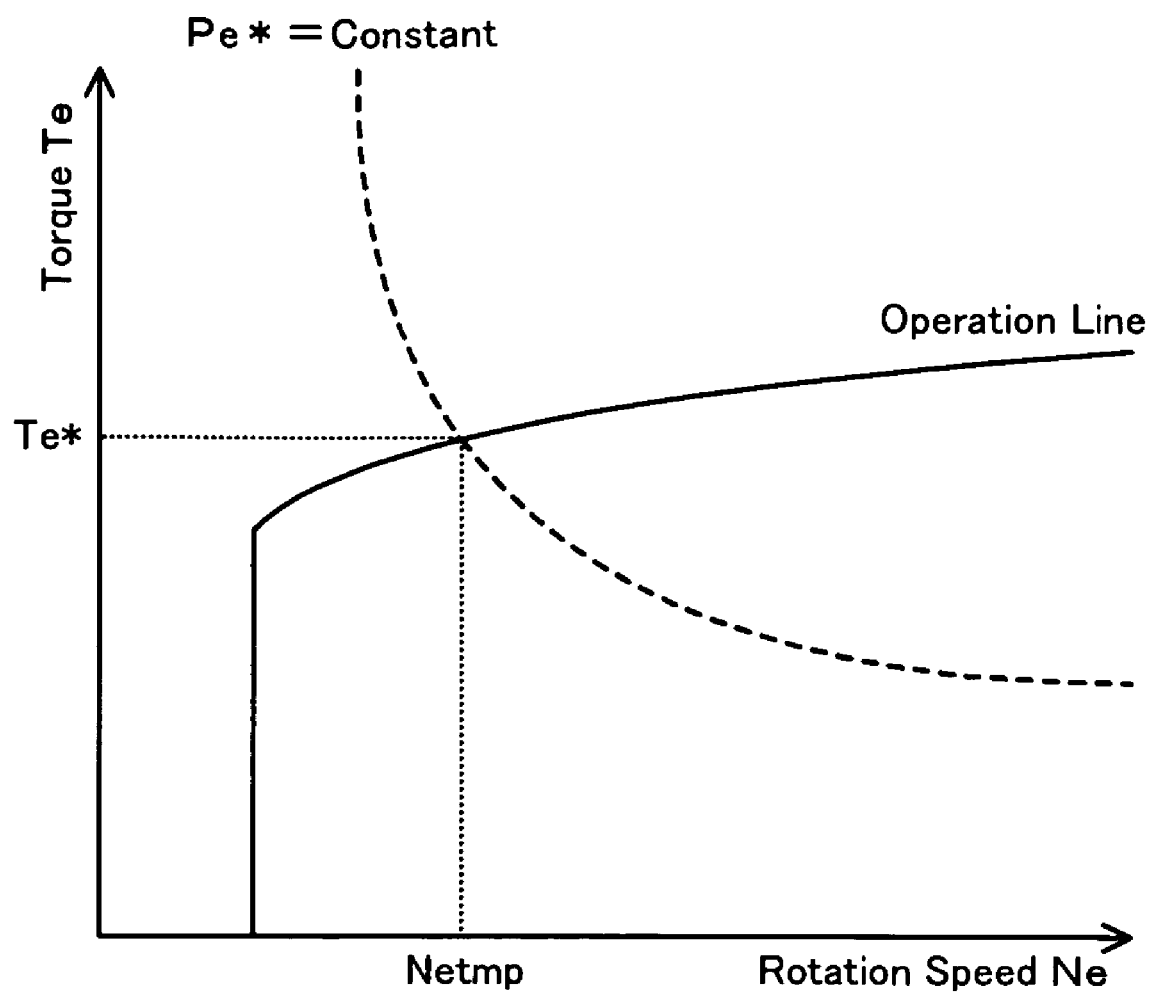
FIG. 11 is an explanatory diagram illustrating an example of a state where an operation line and a tentative engine rotation speed Netmp for driving an engine 22 efficiently are set.

Next, a tentative engine rotation speed Netmp is set based on the set target torque Te* and the operation line for efficient driving of the engine 22 (Step S160), and the set tentative engine rotation speed Netmp is limited by the upper and lower limit rotation speeds Nmax, Nmin so as to set the target rotation speed Ne* of the motor MG2 (Step S170). A state where the operation line and the tentative engine rotation speed Netmp are set for efficient driving of the engine 22 is shown in FIG. 11. And a torque command Tm1* of the motor MG1 is set by the following equation (5) so that the engine 22 is rotated at the target rotation speed Ne* (Step S180), and a value 0 is set to a brake torque command Tb* for having the braking torque act on the drive wheels 39a, 39b and the driven wheels, not shown, by adjusting the hydraulic pressure of the brake wheel cylinders 96a to 96d (Step S190). The target rotation speed Ne* of the engine 22 and the target torque Te* are transmitted to the engine ECU 24, the torque command Tm1* of the motor MG1 to the motor ECU 40, and the brake torque command Tb* to the brake ECU 94 (Step S240), and this routine is finished. An equation (5) is a relational expression in feedback control to rotate the engine 22 at the target rotation speed Ne*, in which k3 in the second term on the right-hand side is a gain of a proportional term, and k4 in the third term on the right-hand side is a gain of an integral term. The engine ECU 24 having received the target rotation speed Ne* and the target torque Te* executes intake air flow control, fuel injection control, ignition control and the like so that the engine 22 is operated at an operation point of the target rotation speed Ne* and the target torque Te*. Also, the motor ECU 40 having received the torque command Tm1* executes switching control of the switching element of the inverter 41 so that the torque corresponding to the torque command Tm1* is outputted from the motor MG1. Moreover, the brake ECU 94 having received the brake torque command Tb* with the value 0 drives and controls the brake actuator 92 so that the braking force does not act on the drive wheels 39a, 39b and the driven wheels.

$$Tm1^*=\text{Previous } Tm1^*+k3(Ne^*-Ne)+k4\int(Ne^*-Ne)dt \quad (5)$$

When it is determined that the torque demand Tr* is a braking torque for deceleration at Step S120, the minimum rotation speed at gear shifting Nchg higher than the idling rotation speed Nidl of the engine 22 is set as the target rotation speed Ne* of the engine 22 (Step S200), a value 0 is set to the target torque Te* of the engine 22 and to the torque command Tm1* of the motor MG1 (Steps S210, S220), and the brake torque command Tb* is set so that the braking force when the torque demand Tr* as the braking torque acts on the ring gear shaft 32a acts on the drive wheels 39a, 39b and the driven wheels (Step S230). The target rotation speed Ne* and the target torque Te* of the engine 22 are transmitted to the engine ECU 24, the torque command Tm1* of the motor MG1 to the motor ECU 40, and the brake torque command Tb* to the brake ECU 94 (Step S240), and this routine is finished. The minimum rotation speed at gear shifting Nchg higher than the idling rotation speed Nidl is set as the target rotation speed Ne* of the engine 22 when the torque demand Tr* is the braking torque for deceleration since large power is to be outputted more rapidly from the engine 22 when the large torque demand Tr* and power are demanded by stepping-on on the accelerator pedal 83 by the driver after that.

Suppose that the accelerator pedal 83 is stepped on in the middle of gear shifting of the transmission 60 while the accelerator is off or the accelerator pedal 83 is slightly stepped on (running state with a low driving force). Till immediately before the accelerator pedal 83 is stepped on, if the torque demand Tr* is the driving torque for acceleration, the processing in Steps S130 to S190 in FIG. 3 is executed and in the steady state, the target torque Te* to have the torque demand Tr* act on the ring gear shaft 32a and the torque corresponding to the torque command Tm1* are outputted from the engine 22 and the motor MG1, while if the demand torque Tr* is the braking torque for deceleration, the processing in Steps S200 to S230 is executed and the engine 22 is driven in a self-sustained manner at the minimum rotation speed at gear shift Nchg and the braking force corresponding to the torque demand Tr* is outputted to the drive wheels 39a, 39b and the driven wheels by the brake (hydraulic brake) by the hydraulic pressure of the brake wheel cylinders 96a to 96d. When the accelerator pedal 83 is stepped on, the accelerator opening Acc is increased according to the stepped-on amount of the accelerator pedal 83, a larger torque demand Tr* is set and based on this, larger values are set for the target torque Te* and the tentative engine rotation speed Netmp of the engine 22 (Steps S130, S160). However, since the target rotation speed Ne* of the engine 22 is set by limiting the tentative engine rotation speed Netmp by the upper limit rotation speed Nmax obtained by adding the fluctuation rate Nrt to which the rate value N2 smaller than the rate value N1 at the normal time when the gear of the transmission 60 is not shifted, a larger value is not set suddenly. Therefore, rise of the rotation speed of the engine 22 is restricted, and the engine 22 is operated with the rise in the rotation speed kept low though the output torque is increased. By this arrangement, a portion used for raising the rotation speed of the engine 22 in the power outputted from the engine 22 can be made smaller, and the portion can be outputted to the ring gear shaft 32a. Also, since the engine 22 is operated at the minimum rotation speed at gear shifting Nchg or more, a large power can be outputted more rapidly than the operation at the idling rotation speed, by which a large power can be outputted more rapidly to the ring gear shaft 32a as the drive shaft. Moreover, since the gear-shifting processing of the transmission 60 is carried out with rotation speed synchronization of the motor MG2 while the motor MG2 is disengaged as mentioned above, the torque shock which can be generated at gear shifting of the transmission 60 can be reduced.

According to the hybrid vehicle 20 of the embodiment described above, when the gear of the transmission 60 is to be shifted while the accelerator is off or the accelerator pedal 83 is slightly stepped on (running state with a low driving force), by setting the target rotation speed Ne* of the engine 22 through setting of the upper limit rotation speed Nmax using the fluctuation rate Nrt to which the rate value N2 smaller than the rate value N1 at the normal time when the gear of the transmission 60 is not shifted, rise of the rotation speed of the engine 22 can be restricted, and the portion used for raising the rotation speed of the engine 22 in the power outputted from the engine 22 can be made smaller and only that portion can be outputted to the ring gear shaft 32a when the accelerator pedal 83 is stepped on and the large torque demand Tr* is demanded. As a result, in the middle of the gear shifting of the transmission 60, rapid changes in the torque demand Tr* can be dealt with quickly. Moreover, since the gear shifting of the transmission 60 is carried out with rotation speed synchronization of the motor MG2 while the motor MG2 is disengaged, the torque shock which can be generated at gear shifting of the transmission 60 can be reduced.

According to the hybrid vehicle 20 of this embodiment, if the torque demand Tr* is the braking torque for deceleration at the gear shifting of the transmission 60 while the accelerator is off or the accelerator pedal 83 is slightly stepped on (running state with a low driving force), by driving the engine 22 at the minimum rotation speed at gear shifting Nchg higher than the idling rotation speed Nidl, larger power can be outputted more rapidly from the engine 22 so as to output the large power more rapidly to the ring gear shaft 32a, which is a drive shaft, when the accelerator pedal 83 is stepped on and the large torque demand Tr* is demanded.

In the hybrid vehicle 20 of this embodiment, if the torque demand Tr* is the braking torque for deceleration at the gear shifting of the transmission 60 while the accelerator is off or the accelerator pedal 83 is slightly stepped on (running state with a low driving force), the engine 22 is driven at the minimum rotation speed at gear shifting Nchg higher than the idling rotation speed Nidl, but the engine 22 may be driven at the idling rotation speed Nidl.

In the hybrid vehicle 20 of this embodiment, the transmission 60 capable of gear shifting in two gears of Hi and Lo is used, but the number of gears in the transmission 60 is not limited to two but may be three or more.

Figure 12:
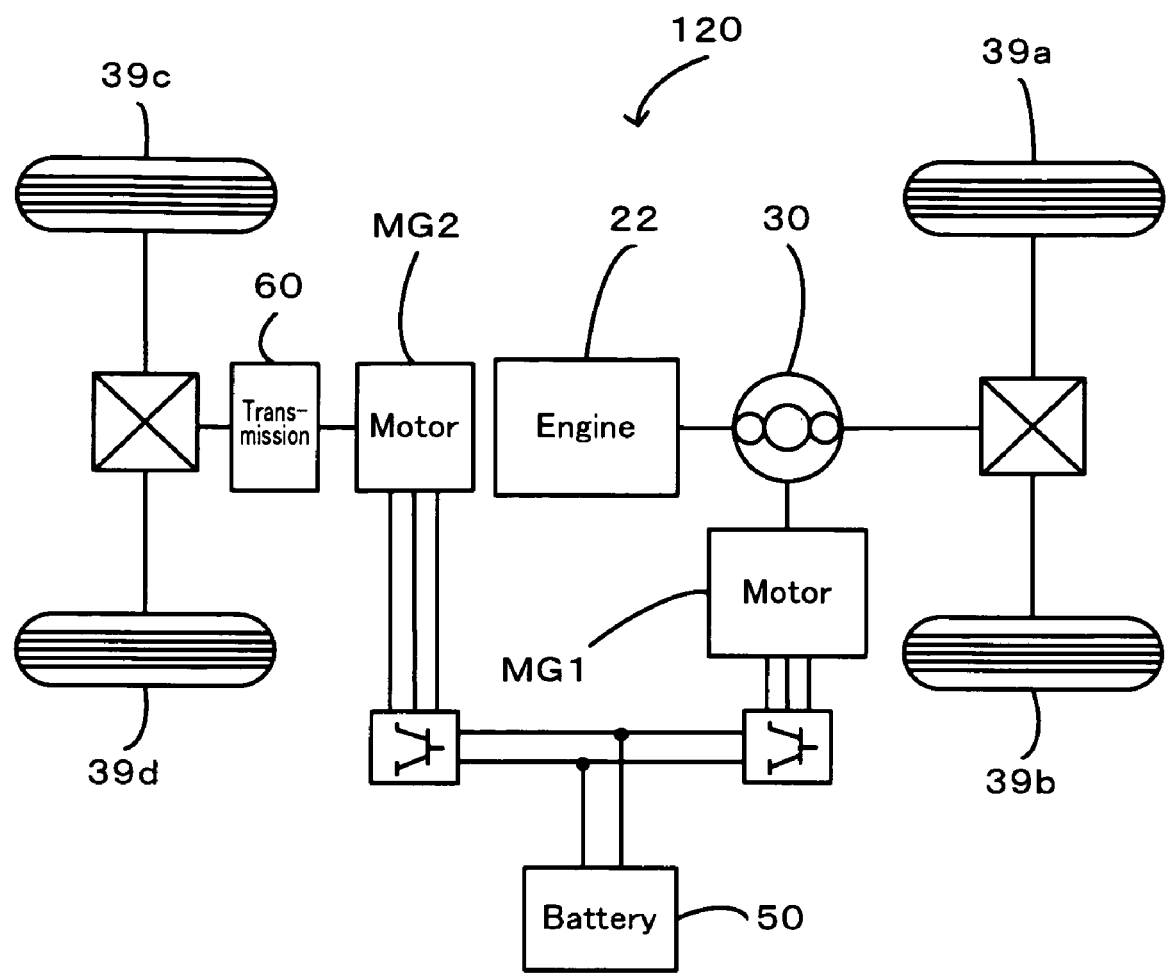
FIG. 12 is a block diagram illustrating an outline of configuration of a hybrid vehicle 120 in a variation.

In the hybrid vehicle 20 of this embodiment, the power of the motor MG2 is shifted by the transmission 60 and outputted to the ring gear shaft 32a, but as exemplified by a hybrid vehicle 120 in a variation shown in FIG. 12, the power of the motor MG2 may be shifted by the transmission 60 and connected to an axle (the axle connected to the wheels 39c, 39d in FIG. 12) different from the axle (axle to which the drive wheels 39a, 39b are connected) to which the ring gear shaft 32a is connected.

Figure 13:
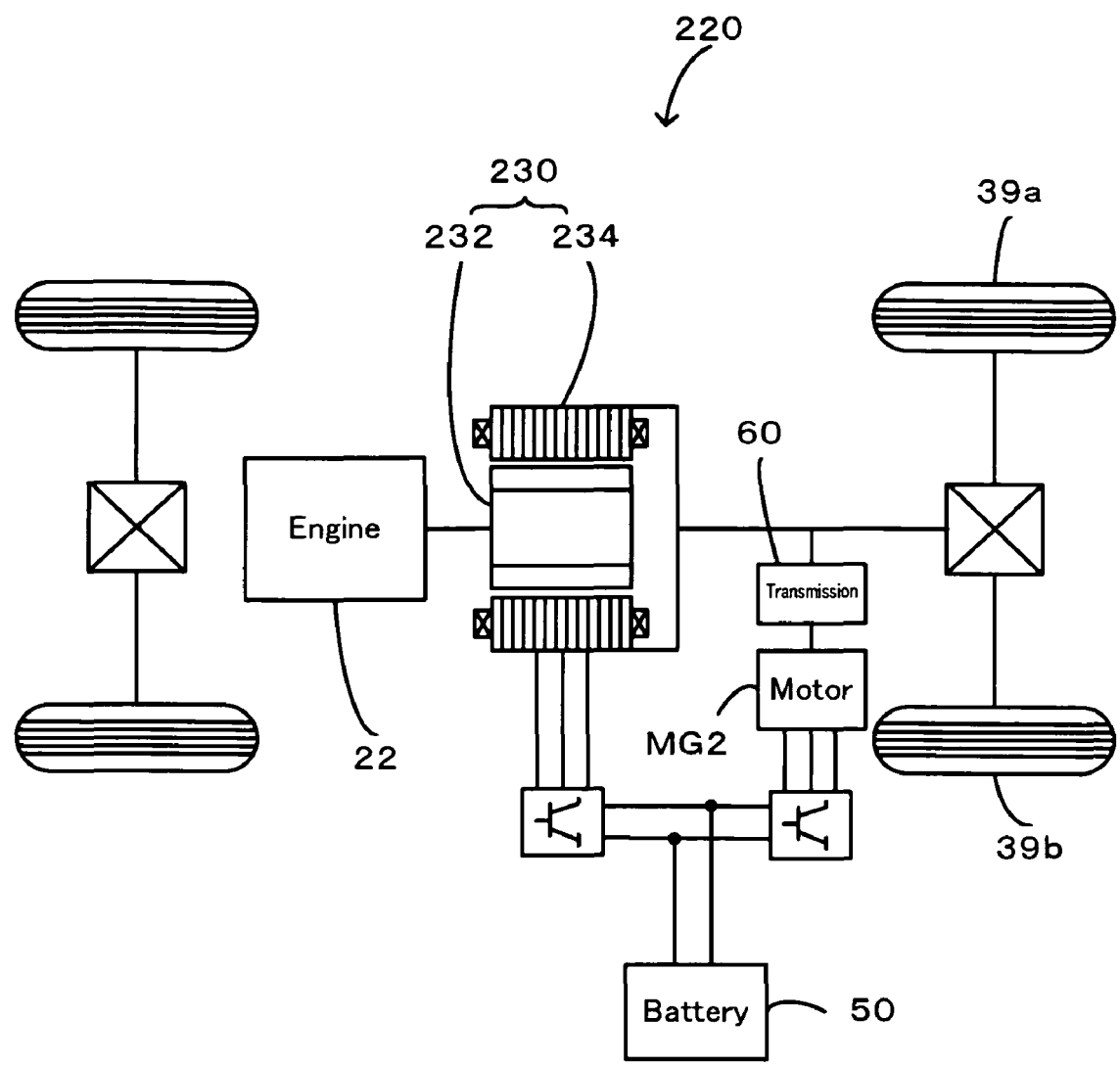
FIG. 13 is a block diagram illustrating an outline of configuration of a hybrid vehicle 220 of a variation.

In the hybrid vehicle 20 of the embodiment, the power of the engine 22 is output via the power distribution and integration mechanism 30 to the ring gear shaft 32a functioning as the drive shaft linked with the drive wheels 39a and 39b. In another possible modification of FIG. 13, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 39*a*, 39*b* and transmits part of the power output from the engine 22 to the drive shaft while converting the residual part of the power into electric power.

In this embodiment, explanation was made as the form of the hybrid vehicle 20, but it may be in a form of a driving device mounted on a vehicle with an engine and a battery capable of being charged/discharged. Also, it may be a method of controlling a vehicle such as the hybrid vehicle 20 or a control method of the driving device.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is preferably applied to the manufacturing industries of vehicles and driving devices and other relevant industries.

The invention claimed is:

1. A vehicle comprising:
   an internal combustion engine;
   an electric power-mechanical power input output mechanism connected to a first axle which is either of axles of the vehicle and to an output shaft of said internal combustion engine, and capable of input/output of power from/to said first axle and said output shaft with input/output of electric power and mechanical power;
   a motor capable of input/output of power;
   a transmission mechanism connected to said first axle or a second axle which is either of the axles different from the first axle and to a rotating shaft of said motor for transmitting power between said first or second axle and said rotating shaft with shifting of a plurality of gears;
   an accumulator unit capable of exchanging electric power with said electric power-mechanical power input output mechanism and said motor;
   a required driving force setting unit for setting a required driving force required for operating said engine; and
   a control unit configured to control said internal combustion engine, said electric power-mechanical power input output mechanism, said motor, and said transmission mechanism so that:
   (a) when a gear of said transmission mechanism is not shifted, said engine is operated in accordance with a driving force based on the required driving force set as above, and a maximum rotation speed of said engine is changed by adding a first rate value, and
   (b) during a gear shift of said transmission mechanism, the gear of said transmission mechanism is shifted while said engine is operated with a driving force based on the required driving force set as above, and the maximum rotation speed of said engine is changed by adding a second rate value smaller than said first rate value such that a rotation speed of said engine is prevented from rising rapidly.

2. A vehicle according to claim 1, wherein said first rate value and said second rate value are maximum change speed at increase of the rotation speed of said internal combustion engine.

3. A vehicle according to claim 1, wherein said control unit is a unit for controlling said transmission mechanism and said motor so that the gear of said transmission mechanism is shifted in a state where a torque from said motor is not outputted to said first or second axle through said transmission mechanism and for controlling said internal combustion engine and said electric power-mechanical power input output mechanism so that running is made by the driving force outputted based on the required driving force set as above to said first axle through said electric power-mechanical power input output mechanism at gear shifting of said transmission mechanism when the required driving force set as above is in a predetermined low driving force range including a value 0.

4. A vehicle according to claim 3, wherein said control unit is a unit for controlling said transmission mechanism and said motor so that gear shifting of said transmission mechanism is continued as a state where a torque from said motor is not outputted to said first or second axle through said transmission mechanism and for controlling said internal combustion engine and said electric power-mechanical power input output mechanism so that running is made by the driving force outputted based on the required driving force increased rapidly to said first axle through said electric power-mechanical power input output mechanism when the required driving force set as above is rapidly increased in the middle of gear shifting of said transmission mechanism.

5. A vehicle according to claim 3, wherein
   said transmission mechanism is a mechanism for shifting said gear by changing an engagement state of a plurality of clutches; and
   said control unit is a unit for gear shifting via a state where said motor is disengaged from said first or second axle side according to the engagement state of the plurality of clutches of said transmission mechanism when the gear of said transmission mechanism is to be shifted.

6. A vehicle according to claim 1, wherein said electric power-mechanical power input output mechanism is provided with a three shaft-type power input output module connected to three shafts of said first axle, the output shaft of said internal combustion engine, and a rotatable third shaft and for input/output of power from/to the remaining shaft based on power inputted/outputted from/to any two shafts of the three shafts, and a generator capable of input/output of power from/to said third shaft.

7. A driving device mounted on a vehicle with an internal combustion engine and an accumulator unit capable of being charged/discharged, said driving device comprising:
   an electric power-mechanical power input output mechanism capable of exchange of electric power with said accumulator unit, connected to a first axle, which is either of axles of the vehicle, and an output shaft of said internal combustion engine and capable of input/output of power from/to said first axle and said output shaft with input/output of electric power and mechanical power;
   a motor capable of exchange of electric power with said accumulator unit and capable of input/output of power;
   a transmission mechanism connected to said first axle or a second axle which is either of the axles different from the first axle and to a rotating shaft of said motor for transmitting power between said first or second axle and said rotating shaft with shifting of a plurality of gears; and
   a control unit configured to control said internal combustion engine, said electric power-mechanical power input output mechanism, said motor, and said transmission mechanism so that:
   (a) when a gear of said transmission mechanism is not shifted, said engine is operated in accordance with a driving force based on a required driving force required to operate said engine and, a maximum rotation speed of said engine is changed by adding a first rate value, and (b) during a gear shift of said transmission mechanism, the gear of said transmission mechanism is shifted while said engine is operated with a driving force based on the required driving force set as above, and the maximum rotation speed of said engine is changed by adding a second rate value smaller than said first rate value such that a rotation speed of said engine is prevented from rising rapidly.

8. A control method of a vehicle, comprising the steps of:

providing a vehicle with an internal combustion engine, an electric power-mechanical power input output mechanism connected to a first axle, which is either of axles of the vehicle, and an output shaft of said internal combustion engine and capable of input/output of power from/to said first axle and said output shaft with input/output of electric power and mechanical power, a motor capable of input/output of power, a transmission mechanism connected to said first axle or a second axle which is either of the axles different from the first axle and to a rotating shaft of said motor for transmitting power between said first or second axle and said rotating shaft with shifting of a plurality of gears, and an accumulator unit capable of exchange of electric power with said electric power-mechanical power input output mechanism and said motor; and controlling said internal combustion engine, said electric power-mechanical power input output mechanism, said motor, and said transmission mechanism so that:

(a) when a gear of said transmission mechanism is not shifted, said engine is operated in accordance with a driving force based on a required driving force required to operate said engine, and a maximum rotation speed of said engine is changed by adding a first rate value, and (b) during a gear shift of said transmission mechanism, the gear of said transmission mechanism is shifted while said engine is operated with a driving force based on said required driving force, and the maximum rotation speed of said engine is changed by adding a second rate value smaller than said first rate value such that a rotation speed of said engine is prevented from rising rapidly.

9. A control method of a driving device mounted on a vehicle, the method comprising the steps of:

providing a vehicle with an internal combustion engine and an accumulator unit capable of being charged/discharged and provided with an electric power-mechanical power input output mechanism capable of exchange of electric power with said accumulator unit, connected to a first axle, which is either of axles of the vehicle, and an output shaft of said internal combustion engine and capable of input/output of power from/to said first axle and said output shaft with input/output of electric power and mechanical power, a motor capable of exchange of electric power with said accumulator unit and capable of input/output of power, and a transmission mechanism connected to said first axle or a second axle which is either of the axles different from the first axle and to a rotating shaft of said motor for transmitting power between said first or second axle and said rotating shaft with shifting of a plurality of gears; and controlling said internal combustion engine, said electric power-mechanical power input output mechanism, said motor, and said transmission mechanism so that:

(a) when a gear of said transmission mechanism is not shifted, said engine is operated in accordance with a driving force based on a required driving force required to operate said engine, and a maximum rotation speed of said engine is changed by adding a first rate value, and (b) during a gear shift of said transmission mechanism, the gear of said transmission mechanism is shifted while said engine is operated with a driving force based said required driving force, and the maximum rotation speed of said engine is changed by adding a second rate value smaller than said first rate value such that a rotation speed of said engine is prevented from rising rapidly.

* * * * *